United States Patent
Chang

(10) Patent No.: US 8,850,422 B2
(45) Date of Patent: Sep. 30, 2014

(54) METHOD FOR MANAGING AN APPLICATION AND APPLICATION PLATFORM

(75) Inventor: Qing Chang, Shenzhen (CN)

(73) Assignee: Tencent Technology (Shenzhen) Company Ltd., Shenzhen (CN)

(*) Notice: Subject to any disclaimer, the term of this patent is extended or adjusted under 35 U.S.C. 154(b) by 0 days.

(21) Appl. No.: 14/122,301

(22) PCT Filed: Mar. 5, 2012

(86) PCT No.: PCT/CN2012/071918
§ 371 (c)(1),
(2), (4) Date: Nov. 26, 2013

(87) PCT Pub. No.: WO2012/163123
PCT Pub. Date: Dec. 6, 2012

(65) Prior Publication Data
US 2014/0101654 A1    Apr. 10, 2014

(30) Foreign Application Priority Data

May 27, 2011  (CN) .......................... 2011 1 0140138

(51) Int. Cl.
*G06F 9/445* (2006.01)
(52) U.S. Cl.
USPC ............................ 717/174; 717/173; 717/175
(58) Field of Classification Search
USPC .................................. 717/172–176; 709/203
IPC ............................. G06F 8/61,8/62, 8/65, 15/177
See application file for complete search history.

(56) References Cited

U.S. PATENT DOCUMENTS

| 6,675,382 | B1 * | 1/2004 | Foster ............................ | 717/177 |
| 7,249,354 | B2 * | 7/2007 | Tigani et al. ................... | 717/177 |
| 7,353,511 | B1 * | 4/2008 | Ziese .............................. | 717/178 |
| 7,882,171 | B1 * | 2/2011 | Mathieu et al. ............... | 709/203 |
| 8,230,415 | B1 * | 7/2012 | Thomas ........................ | 717/173 |
| 8,261,258 | B1 * | 9/2012 | Jianu et al. .................... | 717/174 |

(Continued)

FOREIGN PATENT DOCUMENTS

| CN | 101336423 A | 12/2008 |
| CN | 101853296 A | 10/2010 |
| CN | 101895872 A | 11/2010 |

OTHER PUBLICATIONS

Tucker et al, "OPIUM: Optimal Package Install/Uninstall Manager", IEEE, pp. 1-10, 2007.*

(Continued)

*Primary Examiner* — Anil Khatri
(74) *Attorney, Agent, or Firm* — Marshall, Gerstein & Borun LLP

(57) ABSTRACT

According to an example of the present invention, an application platform installs a first application upon receiving a request for installing the first application, and sends a summary of the first application to a server; in which an application list is maintained for each user in the server and the application list is to store summaries of all of applications installed by each user. The application platform uninstalls a second application upon receiving a request for uninstalling the second application, and notifies the server to delete a summary of the second application from an application list corresponding to a user sending the request for uninstalling the second application; in which the first application and the second application are a same application or different applications.

10 Claims, 3 Drawing Sheets

(56) References Cited

U.S. PATENT DOCUMENTS

| | | | |
|---|---|---|---|
| 8,285,949 B2* | 10/2012 | De Atley et al. | 711/154 |
| 8,356,295 B2* | 1/2013 | Yaldwyn et al. | 717/175 |
| 8,458,300 B2* | 6/2013 | Rive et al. | 709/220 |
| 8,458,695 B2* | 6/2013 | Fitzgerald et al. | 718/1 |
| 8,464,249 B1* | 6/2013 | Goldman et al. | 717/176 |
| 8,527,982 B1* | 9/2013 | Sapuntzakis et al. | 717/174 |
| 8,533,703 B2* | 9/2013 | Cheng et al. | 717/172 |
| 8,650,558 B2* | 2/2014 | DePoy | 717/174 |
| 8,661,406 B2* | 2/2014 | Shapiro | 717/106 |
| 2002/0032763 A1 | 3/2002 | Cox et al. | |
| 2010/0287552 A1 | 11/2010 | Kim et al. | |
| 2011/0046956 A1 | 2/2011 | Auburn et al. | |

OTHER PUBLICATIONS

Klein et al, "Unwitting Distributed Genetic Programming via Asynchronous JavaScript and XM" ACM, pp. 1628-1635, 2007.*

Murakami et al, "A Web-based Installation Manual Management System for Open Source Software" IEEE, pp. 1261-1266, 2009.*

Srikanth et al, "Software Installation on a Huge Heterogeneous Network using Mobile Agents", IEEE, pp. 1-4, 2007.*

International Search Report for PCT/CN2012/071918 dated Jun. 14, 2012.

Search Report in EP Application No. 12792185.6 dated May 27, 2014.

* cited by examiner

| message ID | way for displaying the message | target user | application ID | message contents |

METHOD FOR MANAGING AN APPLICATION AND APPLICATION PLATFORM

FIELD OF THE INVENTION

The present invention relates to application providing technologies, and more particularly, to a method for managing an application and an application platform.

BACKGROUND OF THE INVENTION

Currently, there are lots of application platforms running on a Windows desktop. A user may search for and select a desired application (which may be referred to as APP) by means of an application market provided by an application platform installed on a client, and the desired application is installed on the platform.

In practice, when the user shifts a login site, e.g., the user logs in client A previously and installs some applications, and then the user logs in client B, then the user needs to re-search the application market for the desired application, and installs the desired application on client B. In this case, the user could not automatically obtain, in some way, a list of applications installed on client A, so that it is very troublesome to the user.

SUMMARY OF THE INVENTION

Examples of the present invention is to provide a method for managing an application, so that a list of applications previously installed can be easily and quickly obtained after a user shifts a login site.

Examples of the present invention is to provide an application platform, so that a list of applications previously installed can be easily and quickly obtained after a user shifts a login site.

Technical solutions provided by the examples of the present invention are implemented as follows.

A method for managing an application includes:

installing, by an application platform, a first application upon receiving a request for installing the first application, and sending a summary of the first application to a server; wherein an application list is maintained for each user in the server, and the application list is to store summaries of all of applications installed by each user; and uninstalling, by the application platform, a second application upon receiving a request for uninstalling the second application, and notifying the server to delete a summary of the second application from an application list corresponding to a user sending the request for uninstalling the second application;

wherein the first application and the second application are a same application or different applications;

wherein the application platform supports at least three kinds of applications comprising an application developed based on an Extensible Markup Language (XML) and a Script, an application developed based on a binary Dynamic Link Library (Dll), and an application developed based on a web page;

wherein the application platform supports the application developed based on the Dll through providing a capability for displaying a graphical interface, a capability for storing user data in the local, a network communication capability, and a security authentication capability;

the application platform supports the application developed based on the XML and the Script through providing the capability for displaying the graphical interface, the capability for storing the user data in the local, the network communication capability, the security authentication capability, a capability for analyzing the XML, and a capability for interpreting and executing the Script; and the application platform supports the application developed based on the web page through providing a capability for providing an interface window, wherein a browser control is embedded in the window, and a capability for loading a designated web page into the embedded browser when the application is started.

A method for managing an application includes:

installing, by an application platform, a first application upon receiving a request for installing the first application, and sending a summary of the first application to a server; wherein an application list is maintained for each user in the server, and the application list is to store summaries of all of applications installed by each user; and uninstalling, by the application platform, a second application upon receiving a request for uninstalling the second application, and notifying the server to delete a summary of the second application from an application list corresponding to a user sending the request for uninstalling the second application;

wherein the first application and the second application are a same application or different applications;

the method further comprising:

obtaining, by the application platform, a first message from the server when the user logs in, and displaying the first message; wherein the first message is a message which has been already sent to the user by the server and is not displayed; and receiving, by the application platform during an online period of the user, a second message from the server, and displaying the second message; wherein the second message is a message which is newly generated and issued by the server to the user during the online period of the user.

An application platform includes:

an application center module, to install a first application or to uninstall a second application upon receiving a request; and a list managing module, to send a summary of the first application to a server for storing, or to notify the server to delete a summary of the second application from an application list corresponding to a user sending a request for uninstalling the second application; wherein an application list is maintained for each user in the server, and the application list is to store summaries of all of applications installed by each user;

wherein the first application and the second application are a same application or different applications;

wherein the application center module comprises:

a first application sub-module, to provide installation and uninstallation capabilities and a running environment of a first application developed based on an Extensible Markup Language (XML) and a Script;

a second application sub-module, to provide installation and uninstallation capabilities and a running environment of a second application developed based on a binary Dynamic Link Library (Dll); and a third application sub-module, to provide installation and uninstallation capabilities and a running environment of a third application developed based on a web page;

wherein the first application sub-module comprises a first interface displaying unit, a first storage unit, a first network unit, a first authenticating unit, an analyzing unit, and an interpreting unit;

the second application sub-module comprises a second interface displaying unit, a second storage unit, a second network unit, and a second authenticating unit; and the third application sub-module comprises a loading unit; wherein the first interface displaying unit is to display a graphical interface of the first application;

the second interface displaying unit is to display a graphical interface of the second application;

the first storage unit is to store user data in the local, and to store the user data into a local database in the form of a two-dimensional table or an independent file;

the second storage unit is to store the user data in the local, and to store the user data into the local database in the form of the two-dimensional table or the independent file;

the first network unit is to provide supports of various communication protocols for the first application, so that the first application has a network communication capability;

the second network unit is to provide the supports of the various communication protocols for the second application, so that the second application has the network communication capability;

the first authenticating unit is to provide a security authentication capability for the first application;

the second authenticating unit is to provide the security authentication capability for the second application;

the analyzing unit is to analyze the XML;

the interpreting unit is to interpret and execute the Script; and the loading unit is to provide an interface window, wherein a browser control is embedded in the window, and to load a designated web page into the embedded browser when the third application is started.

An application platform includes:

an application center module, to install a first application or to uninstall a second application upon receiving a request; and a list managing module, to send a summary of the first application to a server for storing, or to notify the server to delete a summary of the second application from an application list corresponding to a user sending a request for uninstalling the second application; wherein an application list is maintained for each user in the server, and the application list is to store summaries of all of applications installed by each user;

wherein the first application and the second application are a same application or different applications;

the application platform further comprising:

a message processing module, to obtain a first message from the server when the user logs in, and to display the first message; wherein the first message is a message which has been already sent to the user by the server and is not displayed; and to receive, during an online period of the user, a second message from the server, and to display the second message; wherein the second message is a message which is newly generated and issued by the server to the user during the online period of the user.

As can be seen from the above that when the examples provided by the present invention are employed, a list of applications previously installed is maintained for each user in the server, and the list can be easily and quickly obtained from the server after the user shifts a login site, so that troubles like re-searching can be avoided.

DETAILED DESCRIPTION OF THE INVENTION

For the problem existing in conventional systems, examples of the present invention provide an improved method for managing an application, including: installing, by an application platform, an application upon receiving a request for installing the application, and sending a summary of the application to a server, wherein a list of installed applications is maintained for each user in the server, wherein the list of the installed applications includes summaries of all of the installed applications; uninstalling, by the application platform, an application upon receiving a request for uninstalling the application, and notifying the server to delete a summary of the application from a corresponding list of installed applications. Therefore, when a user shifts a login site, an application platform on a client logged in by the user can easily and quickly obtain a list of applications previously installed from the server. In this case, the application to be installed and the application to be uninstalled may be the same application or may be different applications.

Hereinafter, the technical solution of the present invention is described in further detail with reference to the accompanying drawings and examples to make the technical solution clearer.

Figure 1:
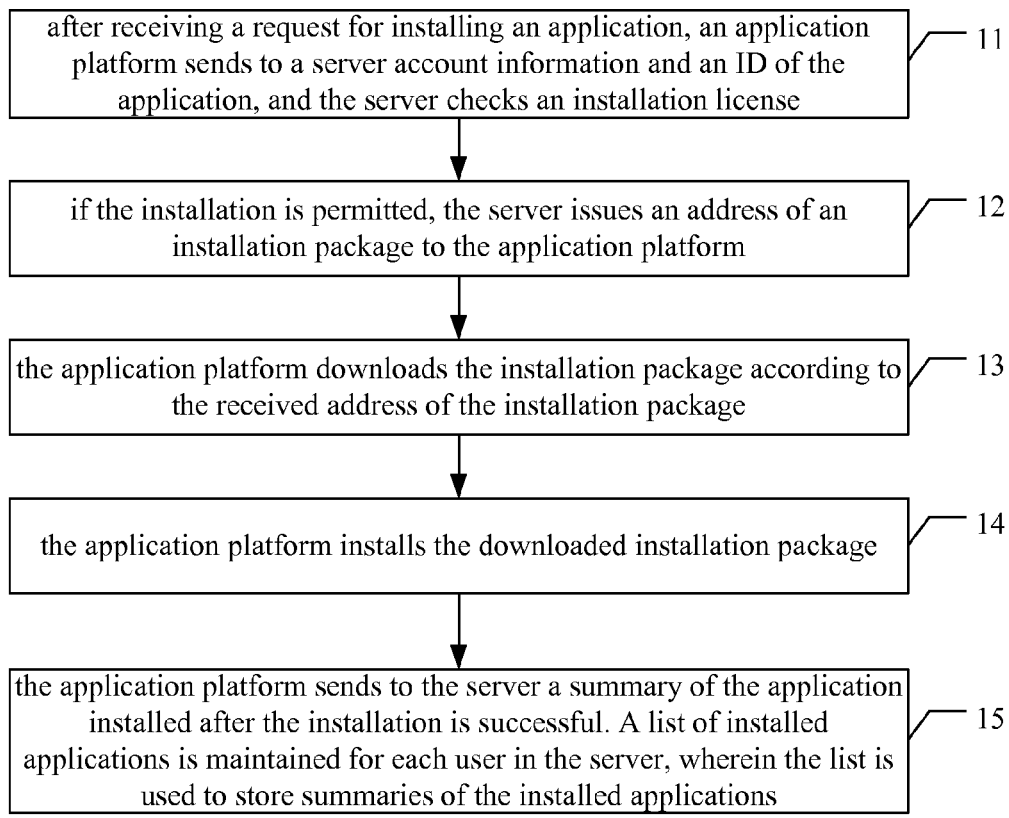
FIG. 1 is a flowchart illustrating a method for installing an application in accordance with an example of the present invention.

FIG. 1 is a flowchart illustrating a method for installing an application in accordance with an example of the present invention. As shown in FIG. 1, the method includes operations as follows.

In block 11, after receiving a request for installing an application, an application platform sends to a server account information and an identifier (ID) of the application, and the server checks an installation license.

In practice, the application platform may provide an application market for a user to select a desired application of the user, and the user clicks on the application for installing.

The account information may include information like a user ID and related permissions.

In block 12, if the installation is permitted, the server issues an address of an installation package to the application platform.

If there are no restrictions like level limitation or purchase opening, the installation is permitted. Accordingly, the server issues the address of the installation package to the application platform, and may issue check information also.

In block 13, the application platform downloads the installation package according to the received address of the installation package.

If the application platform receives the check information simultaneously, then in this block, the application platform checks the integrity and legitimacy of the download installation package in accordance with the received check information after downloading the installation package according to the received address of the installation package. Block 14 is performed when the check is passed.

In block 14, the application platform installs the downloaded installation package.

The installation process mainly includes operations as follows.

1) resources and a running file is copied into a designated directory; and 2) new application information is registered in an encrypted application registry file, wherein the new application information includes start-up information and running parameters.

In block 15, the application platform sends to the server a summary of the application installed after the installation is successful. A list of installed applications is maintained for each user in the server, wherein the list is used to store summaries of the installed applications.

The summary may include the application ID and the address of the installation package, etc. Subsequently, if the user wants to install an application that is in the list of installed applications after the user shifts a login site, the application is directly installed in accordance with the summary including the address of the installation package.

Figure 2:
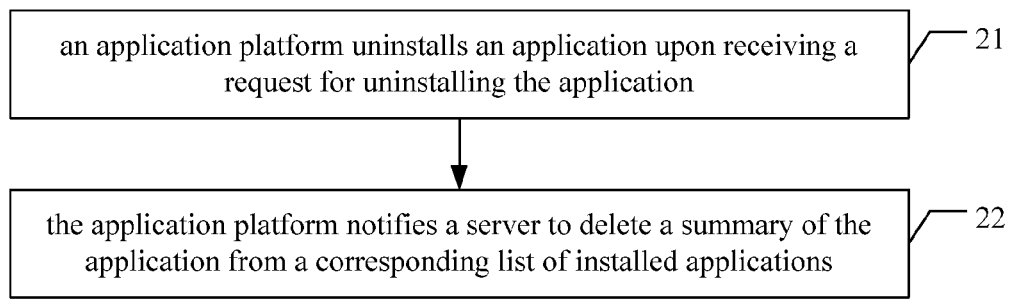
FIG. 2 is a flowchart illustrating a method for uninstalling an application in accordance with an example of the present invention.

FIG. 2 is a flowchart illustrating a method for uninstalling an application in accordance with an example of the present invention. As shown in FIG. 2, the method may include operations as follows.

In block 21, an application platform uninstalls an application upon receiving a request for uninstalling the application.

The uninstallation process mainly includes operations as follows.

1) information about the application is deleted from an encrypted application registry file; and 2) running resources and temporary files of the application in the local are cleaned up.

In block 22, the application platform notifies a server to delete a summary of the application from a corresponding list of installed applications.

In practice, a user may view updated information, i.e., upgrade information, of an installed application through the application market. An upgrade process is a recombination process, in which the installation process and the uninstallation process are integrated. That is, an original application is uninstalled according to the method shown in FIG. 2 firstly, and then an upgraded application is installed according to the method shown in FIG. 1.

In addition, the application platform may display the list of the installed applications with a friendly interaction interface, wherein the list of the installed applications is obtained by the application platform from the server. In order to provide a better service to the user and to meet demands of the user as much as possible, the application platform provided by the example of the present invention supports applications with various types, and provides a friendly application programming interface (API), so that each application may use functions provided by the application platform itself. Specifically, the application platform may support at least three kinds of applications including an application developed based on an Extensible Markup Language (XML) and a Script, an application developed based on a Dynamic Link Library (Dll), and an application developed based on a web page. For ease of description, hereinafter these three kinds of applications are referred to as XscApp, DllApp, and WebApp.

Hereinafter, the above three kinds of applications are described, respectively.

1) DllApp

This kind of application is developed using a high performance language like C++, and a function of the application is ultimately registered to the application platform in the form of the Dll.

Advantages of this kind of application are that there is a good logic encapsulation within the internal of the Dll; it has a strong capability as being developed using the high performance language like C++, e.g., the construction of a user interface does not depend on a browser, but uses a window system of a normal Windows desktop application, etc.

Scene: it is suitable to open to a team trusted by a company to develop related advanced applications.

To support running of this kind of application, the application platform provides a series of basic service capabilities including:

A, a capability for displaying a graphical interface, i.e., to provide an interface engine;

B, a local storage capability for user data, i.e., the user data is stored in a local database in the form of a two-dimensional table or an independent file;

C, a network communication capability, i.e., to provide, for this kind of application, supports of communication protocols such as the Transmission Control Protocol (TCP), the User Datagram Protocol (UDP), and the Hypertext Transfer Protocol (HTTP), etc., so that this kind of application may have the network communication capability; and D, a security authentication capability, i.e., to provide capabilities like login and authentication.

In practice, the above capabilities are usually developed using the C++ language. The DllApp may directly call the above capabilities because the DllApp is developed based on the C++ language also.

2) XscApp

This kind of application includes three kinds of documents, i.e., XML, Script, and Pic. Among them, the XML is used to describe an interface presentation of the application, including a size of a window, a size, a position, and a style of a button, and transparency of an icon, etc. The Script is used to describe an interaction logic of the application, e.g., a message prompt box is popped up when a user clicks on a button, etc. The Pic refers to all of icons and material files used by the application.

Advantages of this kind of application are that difficulties and costs for developing this kind of application are lower; the XML may be quickly defined through an interface editor in the aspect of constructing an interface; logic description becomes easy and understandable for the simplicity of the Script; more importantly, a binary part/code is not included, so that it is very simple to review; capabilities of the Script may be strictly limited, so that it does not pose any security threat to the application platform itself.

Scene: it is suitable to open to a third-party company for developing, and there is a great advantage in both the development and the review.

Supports required by this kind of application are the same as those required by the DllApp, i.e., the application platform provides basic service capabilities like the above A, B, C, and D to support running of the XscApp. Since the XscApp is implemented by the XML and the Script, and cannot directly employ a development capability of the C++ language, an additional "middle layer" is required to provide support, i.e., the application platform also provides a capability for analyzing the XML and a capability for interpreting and executing the Script.

In this case, the capability for analyzing the XML means that an interface engine supporting XML deserialization is required to construct interface primary colors, so that each node of the XML can be strictly translated into one or more than one interface control trees and a desired interface effect can be achieved.

The capability for interpreting and executing the Script means to provide a script engine which is used to interpret and execute a logic script in the XscApp and mainly implements two functions including controlling a user interface constructed by the interface engine, such as displaying and hiding of a window, switching of a button, etc.; and implementing the local storage of the user data, the network communication, and the security authentication, etc., using basic services provided by a underlying layer. As the script engine can only perform logic processing, and does not have capabilities like the above storage, communication, and security authentication, these basic services are associated with the script engine in a manner of a service registration.

3) WebApp

Configuration information like an icon, a text description and a Uniform Resource Locator (URL) may be registered when this kind of application is registered. When a user clicks on an icon of an application, the application platform pops up an interface window in which a browser control is embedded, and loads a web page to which the URL points.

An advantage of this kind of application is that existing web applications developed based on the web may be reused.

Scene: it is suitable to host an existing and simple web application such as a recharging website or a navigation station.

To support running of this kind of application, the application platform provides capabilities including a capability for providing an interface window, wherein a browser control is embedded in the window, and a size, a title, and an icon of the window may be configured according to the configuration information; and a capability for loading a designated web page, i.e., the web page to which the URL points, into the embedded browser when the application is started.

So far, descriptions about the three kinds of applications provided by examples of the present invention are completed. Although there is a great difference in the installation package formats and the running ways of the above three kinds of applications, installation processes and uninstallation processes of these three kinds of applications are basically the same, as shown in FIG. 1 and FIG. 2.

Further, an example of the present invention provides concepts of a message channel and a recommendation channel to accelerate the popularization of the application.

Among them, the message channel allows the user to see the latest dynamical information about an application without starting the application. A typical scenario is "application dynamics", i.e., the user may see, in an application dynamic panel after the user logs in, the latest dynamical information about several applications, such as "three files in the file transfer station are expired", "buddy *** leaves a message in your blog", etc. Based on this, a recommendation channel for a buddy to recommend an application may be further proposed, i.e., when using an application, the user may recommend the application to a buddy if the user likes the application, and an application recommendation message is generated based on this, wherein the message may carry a comment of the user on the application; the application recommendation message is broadcasted, through the recommendation channel, into a Social Networking Services (SNS) relationship network of the user for spreading out.

The popularization of the application is no longer limited to a traditional way due to the proposing of the message channel and the recommendation channel, and becomes more flexible and intelligent.

Figures 3, 4:
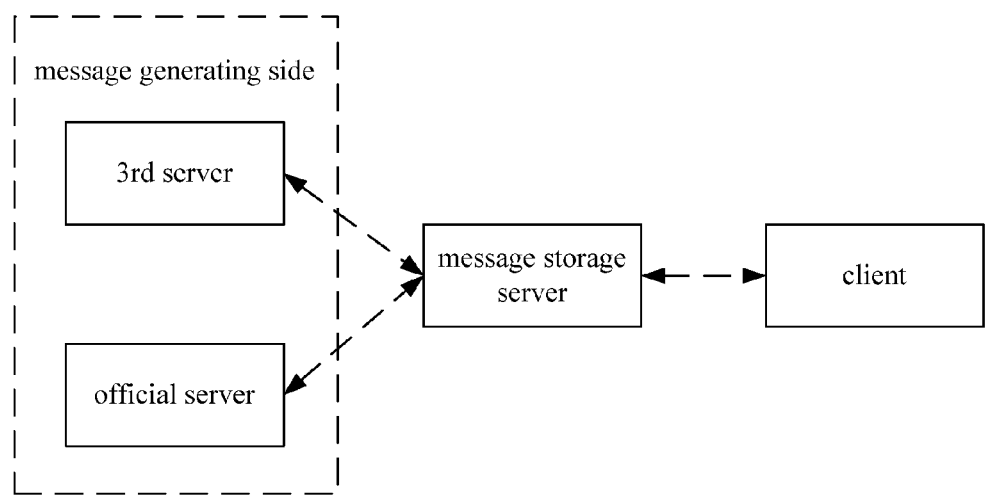
FIG. 3 is a schematic diagram illustrating a message channel and a recommendation channel in accordance with an example of the present invention.
FIG. 4 is a schematic diagram illustrating a message format in accordance with an example of the present invention.

FIG. 3 is a schematic diagram illustrating the message channel and the recommendation channel in accordance with an example of the present invention. As shown in FIG. 3, it relates to three parts including a message generating side, a message storage server, and a client.

Among them, the message generating side includes a third-party server (3rd server) and an official server. The 3rd server is used to provide background supports for a designated application, and generate an application dynamic message associated with the application (an application dynamic message is generated once the application is updated). The official server is used to transmit an application recommendation message generated by a buddy.

The message storage server is used to maintain a message stack for each user. A target user of a message is analyzed when the message is received, and the message is pushed into a message stack corresponding to the target user.

Each message is uniquely determined by a 64-bit timestamp at which the message is generated. FIG. 4 is a schematic diagram illustrating a format of the message in accordance with an example of the present invention. As shown in FIG. 4, the format includes a message ID, a way for displaying the message, a target user, an application ID and message contents. Among them, the message ID is the 64-bit timestamp at which the message is generated. The way for displaying the message is used to illustrate in which manner the message is displayed, for example, a manner for popping up a tip may be employed, it may be determined according to information like the message contents which manner may be employed. The target user is used to illustrate to which user the message is sent. The application ID is used to illustrate with which application the message is associated. The message contents are described using an XML format. The message contents may be encrypted and compressed when there is a need.

The client is a receiver and a displayer of the message. When a user logs in, the application platform may obtain, from the message storage server, messages that have been already sent to the user and are not displayed, and display the messages. For example, it may detect, according to the timestamp, which messages are generated between the last logout of the user and the login of the user this time, these messages are the messages that are not displayed. During an online period of the user, if a new generated message is received, the message storage server may actively issue the message to the application platform, and the application platform displays the message. Reversely, when the user uses an application and recommends the application to a buddy, the application platform generates an application recommendation message and sends to a buddy selected by the user through the message storage server.

For the message storage server, the number of messages stored in each message stack is usually limited, so that messages which have been already displayed to the user may be deleted from the message stack. Alternatively, messages that are pushed at the earliest time are deleted using the first in-first out (FIFO) principle once the message stack is full, wherein the number of the messages deleted is the same as the number of messages newly pushed, examples of the present invention do not limit the specific implementations.

Figure 5:
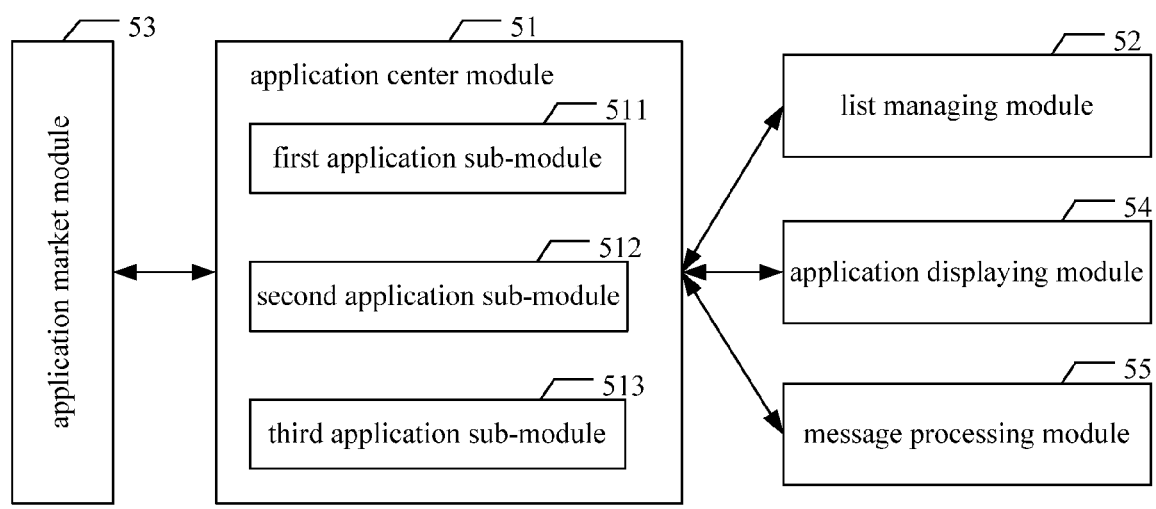
FIG. 5 is a schematic diagram illustrating a structure of an application platform in accordance with an example of the present invention.

Based on the above descriptions, FIG. 5 is a schematic diagram illustrating a structure of an application platform in accordance with an example of the present invention. As shown in FIG. 5, the application platform includes:

an application center module 51, to install or uninstall an application according to a request received; and a list managing module 52, to send a summary of the installed application to a server for saving, and to notify the server to delete a summary of the uninstalled application from a corresponding list of installed applications; wherein a list of installed applications is maintained for each user in the server, and is used to store summaries of the installed applications.

The application platform shown in FIG. 5 may further include:

an application market module 53, to provide an application market for a user to select a desired application; and/or, an application displaying module 54, to display the list of the installed applications with a friendly interaction interface, wherein the list of the installed applications is obtained by the application platform from the server.

It should be noted that the function of the application market may be provided by the application market module 53, and is to provide resource packages and description information of each application. The application market may be implemented in the form of an application, which is the only one application having an operation permission for managing an interface in the whole application platform. By this way, the application platform does not need to provide an independent entrance for the application market in the interface, so that the interface is very refreshing. At the same time, since the nature of the application market is an application, the user may adjust a position of the application market as operating an ordinary application, so as to facilitate the management of the user.

The application center module 51 may include:

a first application sub-module 511, to provide installation and uninstallation capabilities and a running environment of an application developed based on the XML and the Script;

a second application sub-module 512, to provide installation and uninstallation capabilities and a running environment of an application developed based on a binary Dll; and a third application sub-module 513, to provide installation and uninstallation capabilities and a running environment of an application developed based on a web page.

In this case, the first application sub-module 511 may further include an interface displaying unit, a storage unit, a network unit, an authenticating unit, an analyzing unit, and an interpreting unit (these units are not shown in the figure to simplify the drawings). The second application sub-module 512 may further include an interface displaying unit, a storage unit, a network unit and an authenticating unit (these units are not shown in the figure to simplify the drawings). The third application sub-module 513 may further include a loading unit (this unit is not shown in the figure to simplify the drawings).

The interface displaying unit is used to display a graphical interface of the application.

The storage unit is used to store user data in the local, i.e., to store the user data into a local database in the form of a two-dimensional table or an independent file.

The network unit is used to provide supports of various communication protocols for the application, so that the application has a network communication capability.

The authenticating unit is used to provide a security authentication capability for the application.

The analyzing unit is used to analyze the XML.

The interpreting unit is used to interpret and execute the Script

The loading unit is used to provide an interface window, wherein a browser control is embedded in the window, and to load a designated web page into the embedded browser when the application is started.

In addition, the application platform shown in FIG. 5 may further include:

a message processing module 55, to obtain, from the server, messages that are sent to the user and are not displayed, display the messages; receive and display, during an online period of the user, messages issued by the server to the user and newly generated during the online period of the user.

The message includes an application dynamic message and/or an application recommendation message, wherein the application recommendation message is a message generated according to a recommendation act from a buddy of the user on the application.

The message processing module 55 may be further used to generate an application recommendation message when the user uses an application and recommends the application to a buddy, and to send the application recommendation message to the buddy selected by the user through the server.

The above-mentioned message may include a message ID, a way for displaying the message, a target user, an application ID, and message contents.

A workflow of the application platform shown in FIG. 5 may refer to descriptions in the above method examples, which are not repeated herein.

The above are several examples of the present invention, and are not used for limiting the protection scope of the present invention. Any modifications, equivalents, improvements, etc., made under the spirit and principle of the present invention, are all included in the protection scope of the present invention.

The invention claimed is:

1. A method for managing an application, comprising:
installing, by an application platform, a first application upon receiving a request for installing the first application, and sending a summary of the first application to a server for storing, wherein the summary of the first application comprises an address of an installation package of the first application; wherein an application list is maintained for each user in the server, and the application list is to store summaries of all of applications installed by each user; and
uninstalling, by the application platform, a second application upon receiving a request for uninstalling the second application, and notifying the server to delete a summary of the second application from an application list corresponding to a user sending the request for uninstalling the second application;
wherein the first application and the second application are a same application or different applications;
wherein the application platform supports at least three kinds of applications comprising an application developed based on an Extensible Markup Language (XML) and a Script, an application developed based on a binary Dynamic Link Library (Dll), and an application developed based on a web page;
wherein the application platform supports the application developed based on the Dll through providing a capability for displaying a graphical interface, a capability for storing user data in the local, a network communication capability, and a security authentication capability;
the application platform supports the application developed based on the XML and the Script through providing the capability for displaying the graphical interface, the capability for storing the user data in the local, the network communication capability, the security authentication capability, a capability for analyzing the XML, and a capability for interpreting and executing the Script; and
the application platform supports the application developed based on the web page through providing a capability for providing an interface window, wherein a browser control is embedded in the window, and a capability for loading a designated web page into the embedded browser when the application is started.

2. A method for managing an application, comprising:
installing, by an application platform, a first application upon receiving a request for installing the first application, and sending a summary of the first application to a server for storing, wherein the summary of the first application comprises an address of an installation package of the first application; wherein an application list is maintained for each user in the server, and the application list is to store summaries of all of applications installed by each user; and
uninstalling, by the application platform, a second application upon receiving a request for uninstalling the second application, and notifying the server to delete a summary of the second application from an application list corresponding to a user sending the request for uninstalling the second application;
wherein the first application and the second application are a same application or different applications;
obtaining, by the application platform, a first message from the server when the user logs in, and displaying the first message; wherein the first message is a message which has been already sent to the user by the server and is not displayed; and
receiving, by the application platform during an online period of the user, a second message from the server, and displaying the second message; wherein the second message is a message which is newly generated and issued by the server to the user during the online period of the user.

3. The method of claim 2, wherein the first message or the second message is an application dynamic message and/or an application recommendation message;
wherein the application recommendation message is a message generated based on an act of a buddy of the user for recommending an application.

4. The method of claim 2, further comprising:
generating an application recommendation message when the user uses an application and recommends the application to a buddy of the user; and
sending, through the server, the application recommendation message to the buddy selected by the user.

5. The method of claim 2, wherein the first message or the second message comprises a message identifier (ID), a way for displaying the message, a target user, an application ID and message contents.

6. An application platform, comprising: an application center module, to install a first application or to uninstall a second application upon receiving a request; and
a list managing module, to send a summary of the first application to a server for storing, wherein the summary of the first application comprises an address of an installation package of the first application, or to notify the server to delete a summary of the second application from an application list corresponding to a user sending a request for uninstalling the second application; wherein an application list is maintained for each user in the server, and the application list is to store summaries of all of applications installed by each user;
wherein the first application and the second application are a same application or different applications;
wherein the application center module comprises;
a first application sub-module, to provide installation and uninstallation capabilities and a running environment of a first application developed based on an Extensible Markup Language (XML) and a Script;
a second application sub-module, to provide installation and uninstallation capabilities and a running environment of a second application developed based on a binary Dynamic Link Library (Dll); and
a third application sub-module, to provide installation and uninstallation capabilities and a running environment of a third application developed based on a web page;
wherein the first application sub-module comprises a first interface displaying unit, a first storage unit, a first network unit, a first authenticating unit, an analyzing unit, and an interpreting unit;
the second application sub-module comprises a second interface displaying unit, a second storage unit, a second network unit, and a second authenticating unit; and
the third application sub-module comprises a loading unit;
wherein
the first interface displaying unit is to display a graphical interface of the first application;
the second interface displaying unit is to display a graphical interface of the second application;
the first storage unit is to store user data in the local, and to store the user data into a local database in the form of a two-dimensional table or an independent file;
the second storage unit is to store the user data in the local, and to store the user data into the local database in the form of the two-dimensional table or the independent file;
the first network unit is to provide supports of various communication protocols for the first application, so that the first application has a network communication capability;
the second network unit is to provide the supports of the various communication protocols for the second application, so that the second application has the network communication capability;
the first authenticating unit is to provide a security authentication capability for the first application;
the second authenticating unit is to provide the security authentication capability for the second application;
the analyzing unit is to analyze the XML;
the interpreting unit is to interpret and execute the Script; and
the loading unit is to provide an interface window, wherein a browser control is embedded in the window, and to load a designated web page into the embedded browser when the third application is started.

7. An application platform, comprising:
an application center module, to install a first application or to uninstall a second application upon receiving a request; and
a list managing module, to send a summary of the first application to a server for storing, wherein the summary of the first application comprises an address of an installation package of the first application, or to notify the server to delete a summary of the second application from an application list corresponding to a user sending a request for uninstalling the second application; wherein an application list is maintained for each user in the server, and the application list is to store summaries of all of applications installed by each user;
wherein the first application and the second application are a same application or different applications;
a message processing module, to obtain a first message from the server when the user logs in, and to display the first message; wherein the first message is a message which has been already sent to the user by the server and is not displayed; and to receive, during an online period of the user, a second message from the server, and to display the second message; wherein the second message is a message which is newly generated and issued by the server to the user during the online period of the user.

8. The application platform of claim 7, wherein the first message or the second message is an application dynamic message and/or an application recommendation message;

wherein the application recommendation message is a message generated based on an act of a buddy of the user for recommending an application.

9. The application platform of claim 7, wherein the message processing module is further to generate an application recommendation message when the user uses an application and recommends the application to a buddy of the user, and to send, through the server, the application recommendation message to the buddy selected by the user.

10. The application platform of claim 7, wherein the first message or the second message comprises a message identifier (ID), a way for displaying the message, a target user, an application ID and message contents.

* * * * *